United States Patent
Lindemann

(10) Patent No.: US 7,458,035 B2
(45) Date of Patent: Nov. 25, 2008

(54) SYSTEM AND METHOD FOR SELECTING AN ITEM IN A LIST OF ITEMS AND ASSOCIATED PRODUCTS

(75) Inventor: Robert Lindemann, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 122 days.

(21) Appl. No.: 10/585,363

(22) PCT Filed: Dec. 28, 2004

(86) PCT No.: PCT/EP2004/014762

§ 371 (c)(1), (2), (4) Date: Jul. 6, 2006

(87) PCT Pub. No.: WO2005/069609

PCT Pub. Date: Jul. 28, 2005

(65) Prior Publication Data

US 2007/0209018 A1    Sep. 6, 2007

(30) Foreign Application Priority Data

Jan. 7, 2004    (EP)    ..................... 04290043

(51) Int. Cl.
  *G06F 15/00*    (2006.01)
  *G06F 13/00*    (2006.01)
(52) U.S. Cl. ..................... 715/784; 715/700
(58) Field of Classification Search ............... 715/784, 715/810, 850, 853, 764–765, 700; 725/43, 725/51

See application file for complete search history.

(56) References Cited

U.S. PATENT DOCUMENTS

| 5,623,613 A | 4/1997 | Rowe et al. | |
|---|---|---|---|
| 2002/0093535 A1 | 7/2002 | Murphy | |
| 2002/0129366 A1 * | 9/2002 | Schein et al. | ................. 725/43 |
| 2002/0135602 A1 * | 9/2002 | Davis et al. | ................. 345/684 |

FOREIGN PATENT DOCUMENTS

WO    WO 03/079661    9/2003

OTHER PUBLICATIONS

Search Report Dated Jul. 11, 2005.

* cited by examiner

*Primary Examiner*—Cao Nguyen
(74) *Attorney, Agent, or Firm*—Joseph J. Laks; Robert D. Shedd; Reitseng Lin

(57) ABSTRACT

The present invention concerns a system and a method for selecting an item in a list of items and associated products. The selecting system comprises means for repeatedly and simultaneously providing at least two sub-lists of items of the list for displaying on a screen, means for controlling an orderly displaying of the items of each of those sub-lists side by side on the screen, simultaneously and in different scrolling zones for the respective sub-lists, means for scrolling at least partly the list of items on the screen in the various scrolling zones, by repeatedly modifying the items of the sub-lists through cancelling firstly introduced items in the sub-lists and introducing new items from the list of items, and means for enabling a user to select at least one of the items of at least one of the sub-lists being displayed in a given selection area. Applications to STB and interactive TV EPG and to music files retrieval.

13 Claims, 5 Drawing Sheets

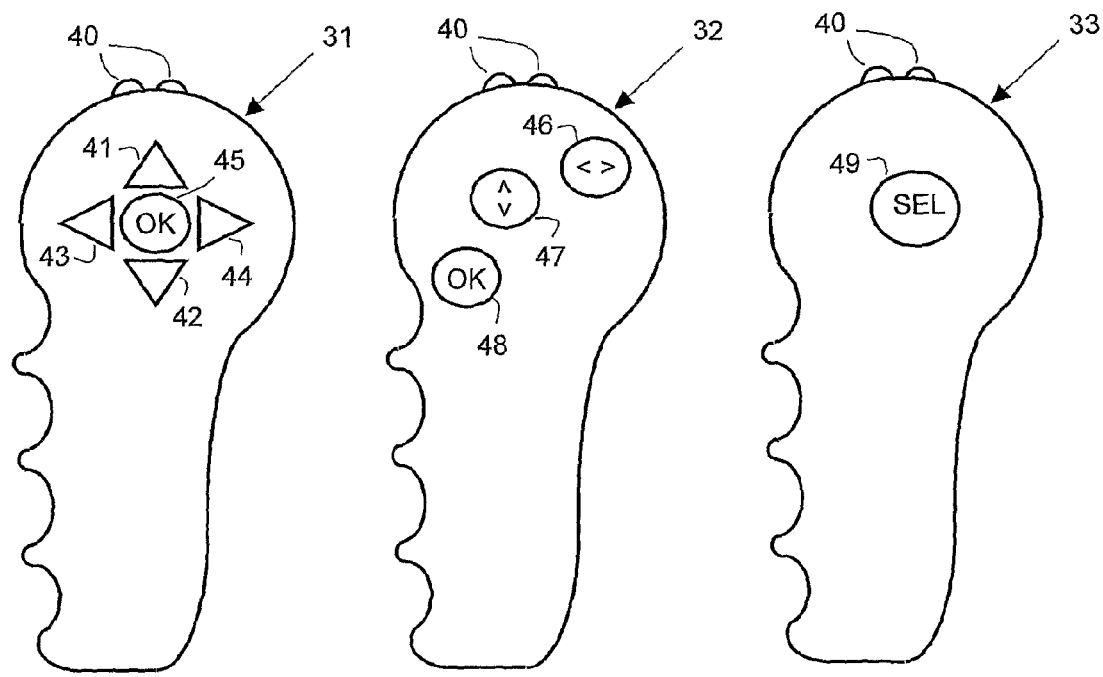
FIG. 6  FIG. 7  FIG. 8
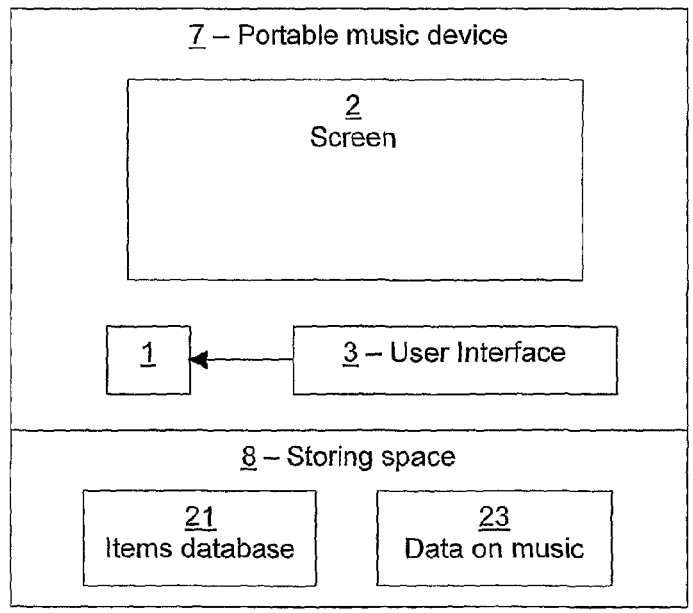
FIG. 9

SYSTEM AND METHOD FOR SELECTING AN ITEM IN A LIST OF ITEMS AND ASSOCIATED PRODUCTS

This application claims the benefit, under 35 U.S.C. §365 of International Application PCT/EP04/014762, filed Dec. 28, 2004, which was published in accordance with PCT Article 21(2) on Jul. 28, 2005 in English and which claims the benefit of European patent application No. 04290043.1, filed Jan. 7, 2004.

The present invention relates to a system and a method for selecting an item in a list of items. It also concerns notably an interactive EPG assembly and an associated broadcast receiver and a file retrieval assembly, in particular for music files. The invention is also related to a remote control, well suited to such a selecting system.

Nowadays, an immense multiplicity of television programs can be received, which renders fast and convenient finding of a desired program difficult. Many users are incapable of keeping the program number of their television set belonging to a broadcast station in mind, or do not want to. Thus, fast switching to the desired broadcast station is not possible, despite generally available numeric keyboards with the numbers 0 to 9.

Moreover, depending upon the principle used, for the input of two or more digit program numbers either the digit sequence has to be entered within a determined period of time, or the number of digits to be entered has to be selected before entering the program number. In the first case, if the user does not enter the desired program number fast enough, switching to an undesired broadcast station may take place during the input of the program number, whereas in the latter case operating additional keys is necessary. If the user were mistaken about the actual program number, either the input must be completed, or he has to select the number of digit positions again and proceed anew in the known manner.

In newer television receivers, a list of station names is frequently indicated, from which the user can select a desired station by means of cursor keys. These station names may be generated automatically, for example from the videotext information, or be manually entered. However, dependent on the screen size and resolution, not all station names may be displayed at one time. Often also, it is not desired to completely cover the entire screen with the list, so that the current program can be further watched until switchover is achieved. In such a case, visible contents of the list must be repeatedly changed, in order to display further station names. The associated necessary interaction of the user can then substantially limit the control comfort.

The sequential switching of the programs by means of selection keys, which in each case select the next higher or next lower program number, is suitable for fast switching through the programs. However, the program sequence is fixed by the programming of the stations in the television receiver. It is thus not possible to avoid selecting a program within the sequence, i.e., to skip this program.

Document EP-A2-1124372 discloses an apparatus able to dynamically adjust the scroll rate used to scroll through the program information for various television programs available to a television viewer. In one embodiment, the electronic program listing is non-interactive, and program information is scrolled across the television screen. In another embodiment, the listing is interactive and the user can select a currently highlighted program. The scrolling operations are then substantially controlled by the user.

Those techniques bring user-friendly improvements for selecting a desired program. However, in the first embodiment, the user must carefully follow the scrolling of the program data, not to miss the desired information, and he must then enter the corresponding number. On the other hand, in the second embodiment, he must actively participate in the finding of the desired program, by paying sustained attention during the whole process that may have a relatively long duration.

The present invention concerns a system for convenient selection of a TV or broadcast station from a multiplicity of TV or broadcast stations, which may allow tuning to a desired station through a minimum effort of key actuations and in a relatively short time.

More generally, the invention pertains to a system for selecting an item in a list of items, which system offers user-friendly selection as well as fast access to desired items to be selected, through a low number of user operations.

The invention also concerns a method for selecting an item in a list of items and a computer program for performing the method.

The invention further relates to an interactive electronic program guide (EPG) assembly, a broadcast receiver and a music file retrieval assembly, comprising the selecting system or performing the selecting method of the invention. It also relates to a remote control, comprising means for remotely controlling the selecting system of the invention.

The invention applies to the fields of EPG, whether for television or radio, and to music files selection, but also notably to computer-aided writing. Throughout the specification the term item includes any kind of data that can be displayed on a display.

To this end, the invention relates to a system for selecting an item in a list of items. The system comprises:
  providing means for repeatedly providing a dynamic display sub-list containing ordered items out of the list of items for displaying on a screen or display,
  display controlling means for controlling an orderly displaying of the items contained in the sub-list on the screen or display, the items being arranged adjacent to each other in a scrolling zone on the screen or display,
  scrolling means for scrolling at least partly the list of items on the screen or display by repeatedly modifying the items of that dynamic sub-list through cancelling firstly introduced items in that sub-list and introducing new items from the list of items into that sub-list, and
  selecting means for enabling a user to select at least one of the items of that sub-list being displayed in a given selection area of the screen.

According to the invention:
  the providing means for providing that dynamic display sub-list provide simultaneously at least one additional dynamic display sub-list of items,
  the display controlling means display simultaneously on the screen at least some of the Ordered items for all the sub-lists in respective different scrolling zones,
  the scrolling means scroll at least partly the list in the various scrolling zones,
  and the selecting means enable a user to select the item displayed in the selection area for at least one of the sub-lists.

The invention relies notably on the unexpected use of two or more scrolling zones for the considered list of items, instead of one as usual. It may be based in particular on the fact that the human eye can recognize scrolling texts on a screen, even if two or more lines are displayed one above the other. In particular, this applies to two scrolling texts having different individual speeds.

Also or instead, it may be used on the ground of complementary information displayed on screen in various scrolling zones, thus enabling faster and more convenient search of data. Indeed, the user may then concentrate his attention on one or the other of the sub-lists, in function of the relevant displayed contents of the list with respect to his expectations.

The selecting system of the invention thus offers a potentially very efficient tool for selecting items in lists, with a possibly reduced number of operations thanks to the combined exploitation of the dynamic sub-lists.

The selection area may cover one or several items in one or each of the sub-lists. It may be considered as a "virtual" area, which may be constituted of several disconnected parts, and which could be totally or partially visible to the user. In case several items are to be selected together in the selection area, a further selection mechanism may be required.

Preferably:
the selecting system also comprises activation means for activating at least one of the sub-lists and for de-activating any other of the sub-lists, wherein only the activated sub-list may be used for selecting one of the displayed items, and the selecting means select the item displayed in the selection area only for the activated sub-list. The sub-lists may also be referred to as scrolling zones in this context.

In this way, the user can select both the relevant sub-list, or scrolling zone, and the desired items therein. In practice, the selection area may cover all of the sub-lists, or scrolling zones, but only the part corresponding to the activated sub-list, or scrolling zone, is used to select the relevant item or items. In an advantageous form of that embodiment, the activation means activate only one of the sub-lists, or scrolling zones, and the selecting means select only one of its items, which appears in the part of the selection area corresponding to the activated sub-list, or scrolling zone.

Also, the scrolling means preferably use at least one lower speed for the activated sub-list or sub-lists and at least one higher speed for the de-activated sub-list or sub-lists. The user may then benefit from having at the same time a higher speed for fast browsing through the list, and a lower speed for precise selection of the desired item or items of the list.

In another embodiment, the selecting means provide in one single user operation a selection of several items, which appear at the same time in the selection area. In this case, the user may either exploit all selected items, or a complementary selection mechanism is used.

In a first embodiment of the complementary selection mechanism the scrolling means scroll the selected items on the screen, and the selecting means enable the user to select one of the pre-selected items in a smaller auxiliary selection area. In a second embodiment of the complementary selection mechanism the selecting means select one item explicitly as a function of a specific instruction given by the user for identifying the desired item, e.g. by pressing a key with a number on a remote control corresponding to a predetermined position in the selection area. In a third embodiment of the complementary selection mechanism the selecting means select the desired item according to the duration of the activation of a key. For example, the user first selects a group of items in the list, which are displayed in the selection area, by activating a selection key on a remote control. The selected group includes items in the different sub-lists. Afterwards, the various items are successively underscored or highlighted as long as the selection key is activated. When the desired item is underscored or highlighted, the user stops activating the selection key and the item which was underscored or highlighted at that instant is selected.

Any of those embodiment of the complementary selection mechanism may be combined with the embodiment above involving the activating means. Namely, the activating means together with the selecting means first provide a pre-selection step, followed by a complementary selection step.

Preferably, the scrolling means automatically scroll the list at different speeds depending on the dynamic sub-lists. It further possible to have different weights given to different kinds of data in the list, the most relevant data being associated to the lowest speed. Preferably, the user may select which sub-list is activated for selection and is thus allotted the lowest speed, so that he can find and select the desired item more quietly and safely. In another form, the items of a sub-list are scrolled at a higher speed in a first scrolling zone for getting one's bearings, the items of the same list being scrolled at a lower speed in a second scrolling zone for later selection in the selection area.

Any combination of the embodiments mentioned above is possible. For example, in a first scrolling zone scrolling at a higher speed the items of one list or sub-list that are presented in a thematic order, while in a second scrolling zone scrolling at a lower speed the items of the same list or sub-list are presented in an alphanumerical order. The user may activate the first or the second of the scrolling zones depending on the current data displayed on screen in both zones. He may either select a single item in the selecting area of the second scrolling zone showing items in an alphanumerical order at a lower speed, or a group of items in the selection area of the first scrolling zone showing items in a thematic order at a higher speed. In the latter case, a further selection step enables him to specify the desired item.

In a further embodiment, the selecting system includes means for reversing the scrolling direction of the items in one or more scrolling zones. When a desired item is missed, it is still possible to retrieve it quickly. This avoids the need to wait for the item to re-appear in the scrolling zone during the next pass. Also, time may be won when the desired items are nearer in the opposite scrolling direction than the current one.

Preferably, the display controlling means use adjacent parallel scrolling bars as the scrolling zones. This embodiment is simple and efficient for fast reading. However, other presentations may be used, for example spiral chains for having simultaneously large amount of data on screen.

According to an advantageous embodiment, the providing means use the same items of the list for all the dynamic sub-lists. Then, notably, the dynamic sub-lists may use not only the same items, but also in the same scrolling order. Anyway, the selection may be made noticeably easier by means of different scrolling speeds, as explained above, or by having available on the screen at the same time different portions of the list, or both. Preferably, in the second case, the providing means provide various sub-lists in which items that are as remote from each other as possible in the list appear simultaneously on the screen in different scrolling zones. For example, with identical scrolling speeds for all sub-lists, the items contained in the sub-lists are separated one from the other by the total number of items of the list divided by the number of sub-lists. In another example the sub-lists contain alphanumerically ordered items, wherein a first sub-list represented in a first scrolling zone contains items beginning with letters A to K and the second sub-list represented in a second scrolling zone contains items beginning with letters L to Z. The distribution may vary depending on the total number of items and their distribution with respect to the letters they begin with.

Otherwise, the dynamic sub-lists represented in respective scrolling zones may use the same items but in a different order, or in opposite scrolling directions.

According to another embodiment, the providing means use complementary items of the list for the respective dynamic sub-lists. The term "complementary" here refers to the presence of at least one item that is present in at least one of the lists and not in the others. In a special form of that embodiment, one of the sub-lists receives items that constitute extracts from another of the sub-lists. The various sub-list contents may then be "nested" one with respect to the other. This enables to give more weight to some chosen items within the whole list. In another form, the items are completely different in each of the sub-lists, i.e. they contain no common item. Advantageously, however, the providing means are such that any two of the sub-lists share at least one of the items of the list.

Advantageously, the providing means are able to provide the items in at least one of the sub-lists with various frequencies of occurrence. This allows for prioritising some items with respect to others, but within a given sub-list instead of using several sub-lists for giving different weights to different items, as mentioned above.

All those embodiments may be combined in any way, and the selecting system may be provided with the capacity to apply several of them according to different user-selectable options.

Advantageously, the selecting system comprises representation means for giving to a user a further representation corresponding to the content of at least one item currently displayed in the selection area. This may make the selecting system more user-friendly and easier to exploit.

According to an advantageous embodiment, the list of items being a first level list of first level items, the selecting system first selects one of those first level items in that first list, and for afterwards selects at least one second level item in at least one second level list of items likewise. A first level item may be linked to at least one second level item, and vice versa. The selecting system further includes means for specifying the second level list in function of the selected first level item. That embodiment leads to a "zoom-in" on the desired information. It is particularly useful when data involve several complex parameters, for example music pieces, which are associated with composers, interpreters, styles, etc., or movies, which are associated or linked with directors, actors, release dates, etc., in databases.

The invention also applies to an interactive electronic program guide assembly, or EPG assembly, characterised in that it includes a selecting system in compliance with any embodiment of the invention. That selecting system may preferably select at least one of a station name and/or a program title in a list of station names and/or a list of program titles, respectively.

The invention further relates to a broadcast receiver, including but not limited to interactive set-top boxes and interactive televisions, characterised in that it comprises an interactive EPG assembly in compliance with the invention. The EPG assembly may notably be implemented in a satellite receiver.

The invention also concerns a music files retrieval assembly, characterised in that it comprises a selecting system in compliance with any of the embodiments of the invention. That selecting system is preferably intended for selecting at least one of a name of interpreter, an album and a title in respectively lists of interpreters, albums and titles. The music file retrieval assembly may be implemented notably in an MP3-player.

The invention is further related to a remote control, characterised in that it comprises remote control means for remotely controlling a selecting system in compliance with any of the embodiments of the invention. Those remote control means include a selection key enabling a user to trigger the providing means, the display controlling means and the scrolling means of the selecting system together, and to select the item or items displayed in the selection area of the screen by triggering the selecting means of the selecting system. Thus, a very limited number of keys on the remote control may be sufficient for controlling the selecting system.

In one advantageous embodiment the selection key is also designed to enable a user to further select at least one of the entities consisting of the dynamic sub-lists and of the items previously selected in the selection area. Thus, the number of required keys is further reduced, and could be theoretically even limited to one single key.

The invention also relates to a method for selecting an item in a list of items comprising the following steps:

repeatedly providing a first dynamic sub-list of ordered items of the list of items for displaying on a screen, controlling an orderly displaying on the screen of the items of the first sub-list, adjacent to each other in a scrolling zone, and scrolling at least partly the list of items on the screen by repeatedly modifying the items of the first dynamic sub-list through cancelling firstly introduced items in the first sub-list and introducing new items from the list of items into the first sub-list, the method enabling a user to select at least one of the items of that sub-list being displayed in a selection area of the screen.

According to the invention:

the providing step includes providing simultaneously with the first dynamic display sub-list, at least a second dynamic display sub-list of items, the display controlling step includes displaying simultaneously on the screen at least some of the ordered items of the first and second sub-lists in respective first and second scrolling zones, the scrolling step includes scrolling at least partly the lists in the various scrolling zones, wherein the method enables a user to select the item or the items displayed in the selection area associated with at least one of the first and second sub-lists or scrolling zones.

The selecting method is preferably executed by means of a selecting system in compliance with any embodiment of the invention.

An additional aspect of the invention is a computer program product comprising program code instructions for executing the steps of the selecting method of the invention when that program is executed on a computer. By "computer program product", it is meant a support for computer program, which can consist not only in a storing space containing that program, such as a diskette or a cassette, but also in a signal, such as an electrical or optical signal.

Some specific embodiments of the selecting system will be described in greater detail in the following. In one embodiment, TV station names scroll as scrolling texts through the picture, wherein the colour of the scrolling text characters differs from the remaining picture content. Each of the scrolling texts may also have a colour bar as a background. Preferably, the length of the station names is limited, e.g. by using appropriate acronyms or abbreviations; this is however not compellingly necessary for the method to function.

If a station name of an activated scrolling text passes a preset point on the screen, the station name may be highlighted. The activated scrolling text is the one from which selections may be made. The highlighting may take place, for example, by changing the background colour or by changing the text colour, text size, text font, or the like. The changes described may be made intermittently, e.g. blinking. If the next station name in the sequence passes the preset point, then this latter name is highlighted, and the station name highlighted before is represented normally again. In a preferred embodiment, a new run of a scrolling text with the station names is started after a preceding run is completed. For selecting a program, the user only needs to issue a selection command applied to the activated scrolling text, when the name of the desired station is highlighted. This can be, for example, an "OK"-key. In particular, if the user did not decide yet for a program, which he would like to watch longer and the program number of which he remembers, comfortable changing of the stations is made possible.

In a preferred development of the invention, two scrolling text bars with the station names run over the screen at different speeds and are displayed one above the other on the screen. The two scrolling texts may also have different background colours, in order to improve the legibility and distinctiveness. Preferably, highlighting in the selection area is active only in one scrolling text; again preferably, this is the scrolling text having the lower speed. If the user now identifies a station name whose program is of interest to him on the scrolling text that is scrolling at a higher speed, he shifts the highlighting to this scrolling text. The shift can take place in a simple way by means of two keys. With scrolling texts arranged one above the other, the shift can take place for example by means of two keys, which exhibit symbols for "up" and "down". If only two scrolling texts are displayed, switching the highlighting between them may also be effected by means of only one key. This switching to and fro is also called "toggle". The scrolling text now having the highlighting in the selection area is then moved at lower speed, while the other scrolling text is moved at higher speed. In a preferred embodiment, both lines of scrolling text show the same station names in a staggered manner or at different speeds, thereby reducing the mean access time for any of the station names.

The entire selection procedure can also be achieved by using a single key only. A first pressing of the single key causes the display of the scrolling texts. A further short operation of the single key switches the highlighting between the scrolling text lines. A long operation of the single key selects the currently emphasized or highlighted station. After the selection of a new station, the scrolling text can be faded out, or fading out takes place if no key actuation took place for a certain time. In the latter case, preferably, a fading out takes place only if a complete run of the station names took place in one or all of the scrolling text lines.

In a further advanced embodiment, the point on the screen, at which a station name is highlighted, i.e. the selection area, can be shifted by means of further keys in or against the direction of motion of the scrolling text. This may serve notably to shorten or extend the time up to the selection of a desired station. The further keys may be provided, for example, with appropriate signs for "left" and "right". Alternatively, the scrolling text currently passing slowly may be switched back or advanced for one or more program names by means of the keys.

Advantageously, a key may be provided, with which the speed of one or all scrolling texts may temporarily be reduced or increased, or one or all scrolling texts are paused.

In a further advanced embodiment, the speed of the scrolling text is adjustable by the user. Further, also the colours of the scrolling texts as well as the background and the highlighting, if applicable, may be adjustable by the user. Further, the text font and method of highlighting may be user-selectable.

In yet a further embodiment, it is possible to select a single highlighting period of time, corresponding to a duration that is sufficient for text fields of bigger length being highlighted. In this way, all fields are highlighted for an equal period of time.

In certain applications, e.g., use for a station selector, the program currently selected may be omitted in the list, so that its name is not displayed.

With regard to the use of the selecting system in different cultures, the place on the screen in which the one or more scrolling texts are displayed, is advantageously selectable. Thus, for example, a scrolling text may be displayed at the lateral edges, in cultures that preferentially read from top to bottom. For cultures which read from the right to the left, it is appropriate to move the scrolling text on the screen from the left-hand side to the right, while it is displayed moving from the right-hand side to the left for cultures which read from left to right. Generally, the user may also select whether the scrolling text is displayed at the upper or lower edge, or at the right or at the left-hand side, respectively.

In a further embodiment, the station names may be displayed in a sorted sequence in the scrolling text, for example in alphabetical order. It is also possible to select various sorting orders of the station names in different scrolling texts, in order to achieve, for example, a statistically shorter access time for any station.

In a further advanced development, the titles of the programs emitted by the stations at present are displayed in place of the station names. It may also be useful to represent titles by suitable short forms, e.g. commonly used acronyms or abbreviations. Such a representation is, for example, easy to implement when using an EPG, as the information necessary is already provided in the digital satellite reception technology.

In another embodiment, the program of the station that is currently highlighted, is shown in a small screen window. The arrangement is then effected as picture-in-picture, also referred to by the acronym PIP or as picture-and-picture, or PAP, in which two substantially equal-sized windows are displayed side-by-side.

The picture of the station the name of which is currently highlighted may also be represented as a full image frame on the screen. In this case, all available programs are consecutively and repeatedly shown briefly to the user, until he makes a selection or terminates the program selection mode.

The indicated station names may also represent a subgroup of all available station names, for example only stations specified as "favourite" stations. It is also possible to manipulate the frequency of occurrence of "favourites" in the entirety of station names in such a way that stations specified as "favourites" occur more frequently in the scrolling texts than those not specified as such. The "favourites" may be identified either automatically or manually.

In other applications, the selecting system of the invention is used to access files or data that are hierarchically ordered in subdirectories. Accordingly, first only the directories or data of the same level are shown in the scrolling texts. If a directory or data item is selected, the files or data in the next lower level are shown in the scrolling text, and so on. Data may be associated or linked with other data that is ordered in different hierarchical levels suitable for the selection method. In a development of the inventive selection system and method, if more than two lines of text can be represented one above the other on the screen or display, the name of the directory or data selected in each case can be displayed in a respective top line which is added before or upon selection. If for example a multiplicity of MP3 music files are stored on a data medium, first the names of the artists can be shown for selection, afterwards the albums and only then the titles of the individual tracks. The selected data item may, in each case, be displayed above the scrolling texts, in an associated field. For the easement of operation, the scrolling text on the title level may show "play all titles" as the first entry and "random play" as the second entry. However, these options may also be made as basic adjustment in other place.

In another embodiment for file or data access, scrolling texts associated with several selection parameters are shown at the same time on the screen. Then, in function of the first selection made by a user for a given parameter, the scrolling texts for the other parameters are adjusted. The operation may be repeated for the selection of next parameters. For example, file access is directed to movies, and the displayed scrolling texts are respectively related to the names of actors, the names of directors and the style of the movie (western, musical, action, love story, etc.). In dependence of the first selection, for example one director, the contents of the other scrolling texts are adapted for next selection. Also, the scrolling text for a data item, e.g. an already selected movie may be used several times when appropriate. This is the case, e.g. when the movie is linked to several actors that may be chosen. Once enough information is given, for example both the names of the director and of one of the actors, a list of the matching movies could be displayed for the determining selection, through automatic scrolling on the screen.

In other applications, the selecting system of the invention is used for the input of alphanumeric data. Accordingly, in the scrolling texts the letters of the alphabet as well as numerals and symbols are shown and selected in one of the ways described above. A weighting of the frequency of occurrence of the letters may be made depending upon the language selected, in order to shorten the input procedure.

In a favourable embodiment, letters that, according to the word formation rules of a selected language, cannot follow one another, may be omitted in the respective scrolling text once a selection is made. This omitting of data items is dynamic, in each case depending on the selection made immediately before. In this way complete texts can be entered using few keys—or even only one single key. In order to enable input of acronyms or abbreviations that do not follow the word formation rules, this function may be at least temporarily disabled by the user.

Using only a small number of keys advantageously reduces the costs of equipment and increases the reliability of the overall system.

The selecting system and method may also be used advantageously with devices, which only have a two-line alphanumeric display. The anyway necessary display can thus be used more efficiently and conveniently in many cases, or a larger display may be replaced by a smaller, less expensive one.

The invention will be better understood and illustrated by means of the following embodiment and execution examples, in no way limitative, with reference to the appended drawings in which:

FIG. 6 represents a first embodiment of a remote control adapted to the TV set of FIG. 2 with the selecting system;

FIG. 7 represents a second embodiment of a remote control adapted to the TV set of FIG. 2 with the selecting system;

FIG. 8 represents a third embodiment of a remote control adapted to the TV set of FIG. 2 with the selecting system;

FIG. 9 shows a portable music device comprising the selecting system, user interface and screen of FIG. 1;

Figure 1:
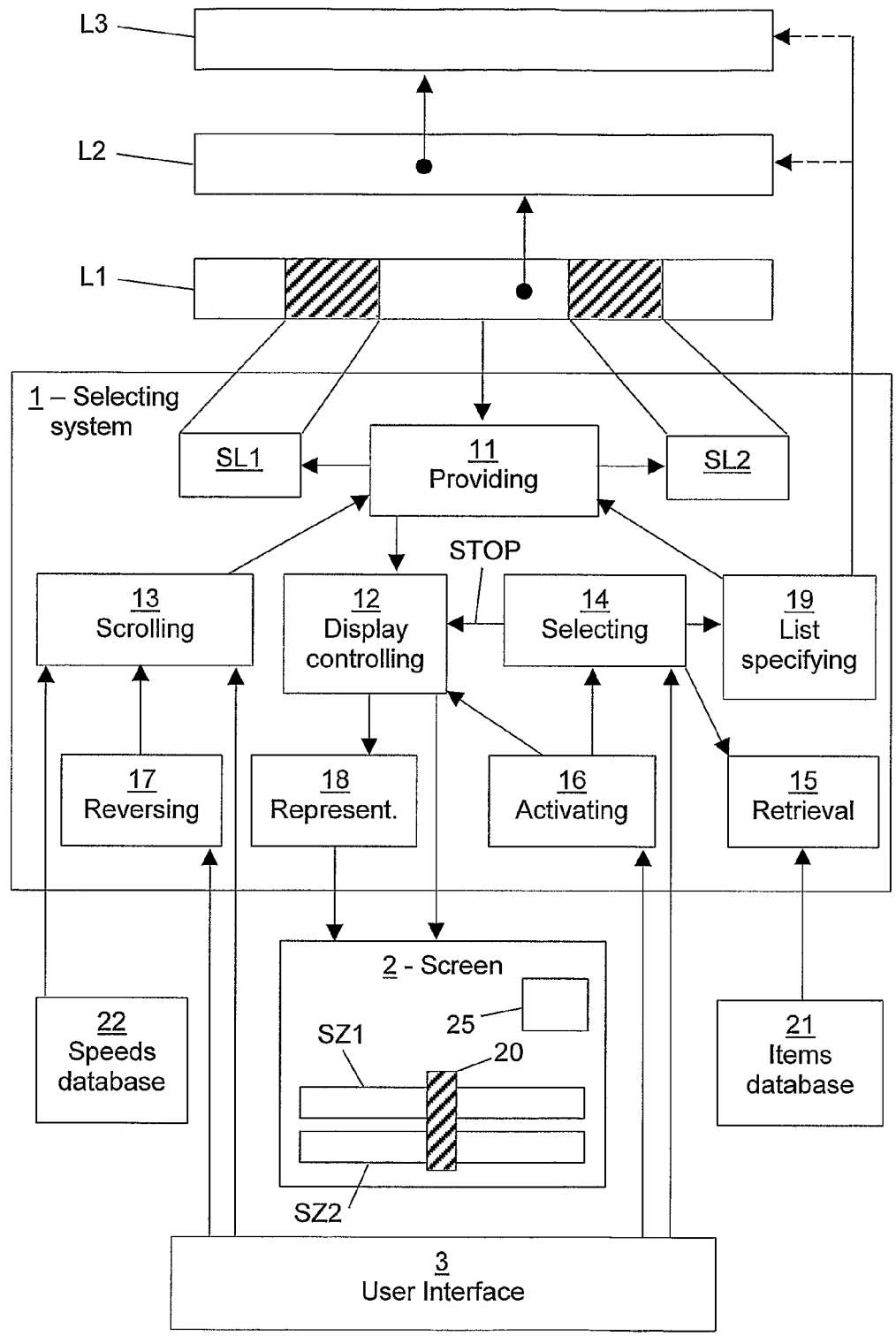
FIG. 1 is a block diagram of a selecting system according to the invention, together with a user interface and a displaying screen.
Figure 2:
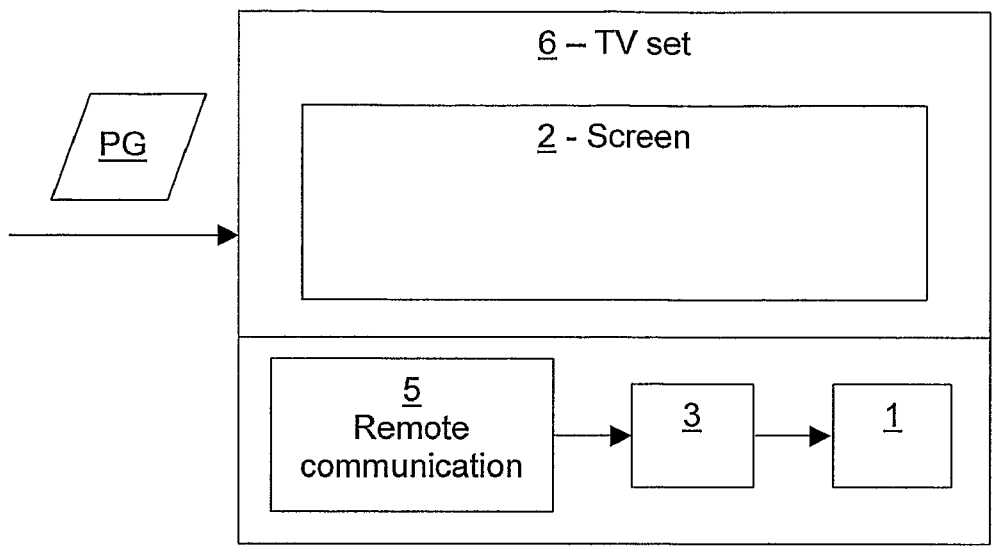
FIG. 2 shows a TV set comprising the selecting system, user interface and screen of FIG. 1.

In FIGS. 1, 2 and 7, the represented units are purely functional entities, which do not necessarily correspond to physical separated entities. Namely, they could be developed in the form of software, or be implemented in one or several integrated circuits.

Moreover, a generic notation liable to be completed by indexes, like for example "SZ" for "scrolling zone", refers to a given model object, e.g. a scrolling zone on screen, which may be specified into specific items, e.g. the scrolling zone SZ1 corresponding to a sub-list SL1 and the scrolling zone SZ1A further corresponding to the considered embodiment "A".

A system for selecting 1 an item from a list L1 of items, as shown in FIG. 1 is used in cooperation with a displaying screen 2 and a user interface 3, SO that a user can effect the selection.

The selecting device 1 comprises:
  a providing unit 11 for repeatedly providing a first and a second dynamic display sub-list of the list L1, respectively noted SL1 and SL2, for displaying on the screen 2;
  a display controlling unit 12 for controlling an orderly displaying of the items of the sub-lists SL1 and SL2 side by side on the screen 2, simultaneously in respectively two scrolling zones SZ1 and SZ2;
  a scrolling unit 13 for scrolling the list L1 on the screen 2 in the two scrolling zones SZ1 and SZ2, by repeatedly modifying the items of the sub-lists SL1 and SL2 through cancelling firstly introduced items in the sub-lists and introducing new items from the list L1, wherein the scrolling unit 13, when operated, scrolls the list L1 at different speeds in the respective scrolling zones SZ1 and SZ2, finding speeds values in a speeds database 22;
  a selecting unit 14 for enabling a user to select at least one of the items in at least one of the sub-lists SL1 and SL2 displayed in a selection area 20 of the screen 2 crossing the scrolling zones SZ1 and SZ2, wherein the selection of an item by a user may trigger a stopping of the display on screen 2, and wherein the stopping is effected by the display controlling unit 12;

a representation unit 18 for giving to a user, further to the displaying of the sub-lists SL1 and SL2, a picture, e.g. a still image or a video sequence, in a representation area 25 on the screen 2 and/or sound representation corresponding to the content of the item or of one of the items currently displayed in the selection area 20;

a reversing unit 17 able to reverse the scrolling direction of the list L1 for one or both sub-lists SL1 and SL2, wherein the same respective speeds apply in the opposite direction; and a retrieval unit 15 for retrieving the selected item or items in an items database 21.

The selecting system 1 also comprises an activation unit 16 for activating one of the sub-lists SL1 or SL2 and for deactivating the other, so that only the activated sub-list can be used to select one of the displayed items in the selection area 20—namely, only the crossing of the selection area 20 with either the scrolling zone SZ1 or the scrolling zone SZ2 is considered for selection. Further, the scrolling unit 13 accordingly applies a lower speed to the activated sub-list and a faster speed to the other.

The user may act on the scrolling unit 13 for accelerating or decelerating the speeds, as well as on the selecting unit 14, the activating unit 16 and the reversing unit 17, through the user interface 3.

The selecting system 1 makes possible a selecting process in several steps, involving successive selections in a plurality of lists L1, e.g. in this specification L1, L2 and L3. Preferably, it comprises also a specifying unit 19, which specifies the list to be used at a given selection step after a first selection step has been completed in dependence of the item selected in the previous step. Thus, after an item has been selected in a first level list L1, the list L2 is determined among several possible second level lists based on the selected item. Likewise, the list L3 is then determined among several possible third level lists based on the item selected in the second step in list L2. Finally, the desired item is extracted from the ultimate level, in the example the third level list L3.

Several applications of the selecting system 1 will now be presented in detail. In a first embodiment shown in FIG. 2, the selecting system 1 is implemented in a TV set 6, which includes also the screen 2 and the user interface 3. The TV set 6, which is provided for receiving broadcast programs PG, also includes a remote communication part 5 for a user to act on the user interface 3 by means of a remote control.

Figure 3:
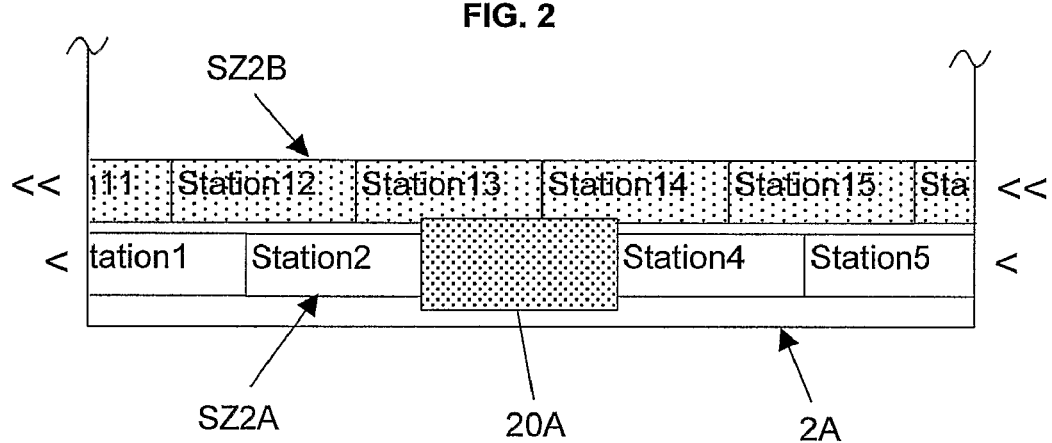
FIG. 3 represents the part of the screen used for two scrolling selecting texts with station names, in the TV set of FIG. 2.

When operated for watching or recording a desired station, the selecting system 1 displays on the bottom part 2A of the screen 2, two parallel and adjacent scrolling bars defining respective lower and upper scrolling zones SZ1A and SZ2A, as shown in FIG. 3. In each of the scrolling zones SZ1A and SZ2A, station names are scrolled through the screen 2A from right to left side. Further, the lower scrolling zone SZ1A is here selected as the activated zone for selection, while the upper scrolling zone SZ2A is not. Thus, the selection area 20 appears to the user as a reduced selection area 20A, restricted to the lower scrolling zone SZ1A. The complete selection area 20 may, however, cover both scrolling zones SZ1A and SZ2A. Also, the scrolling of the station names in the upper scrolling zone SZ1A is faster than in the lower scrolling zone SZ2A, as indicated by the double pointed parentheses in contrast to the single pointed parentheses in the lower scrolling bar. Further the colours of the background are not the same for the two scrolling bars, indicated by a lighter colour for the lower scrolling zone SZ1A.

If the user activates the upper scrolling zone SZ2A instead of the lower one SZ1A, the apparent reduced selection area 20 would move upwards to the scrolling zone SZ1A and the speeds would also be inverted, i.e. faster speed for scrolling zone SZ1A. The colours of the background may additionally be inverted for both bars.

Figure 4:
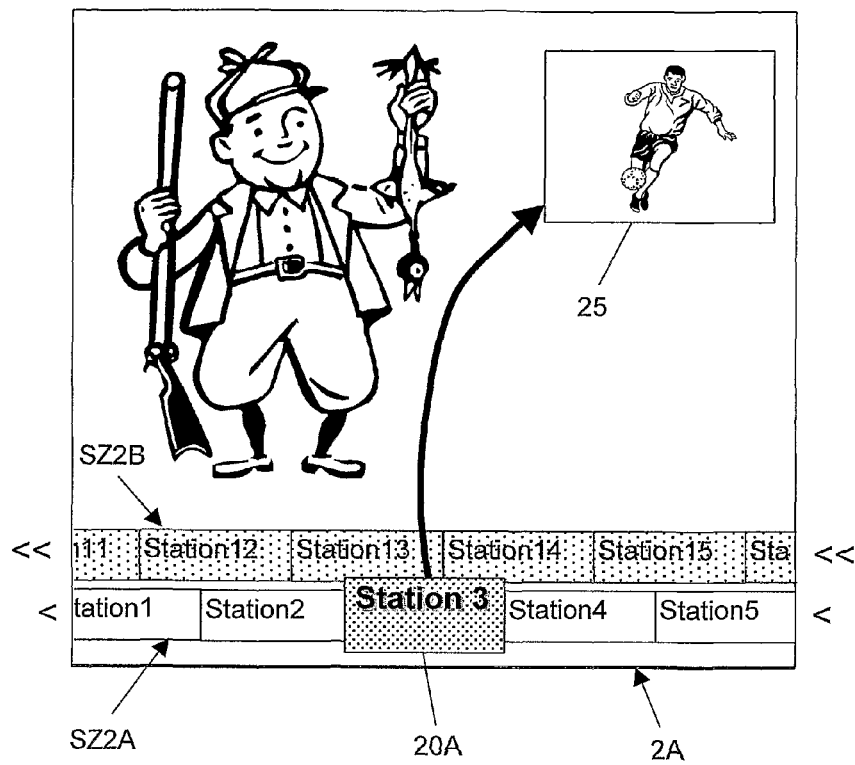
FIG. 4 shows the complete screen partially shown in FIG. 3, with a further picture displayed corresponding to the station name of the activated scrolling text in the selection area.

In a broader view of the screen 2A, as shown in FIG. 4, it can be seen that a picture is inserted in the representation area 25 of the screen 2A in the upper right corner. Therein, a still image or a video sequence is shown, illustrating the program currently broadcast on the channel associated with the station name in the selection area 20A.

Figure 5:
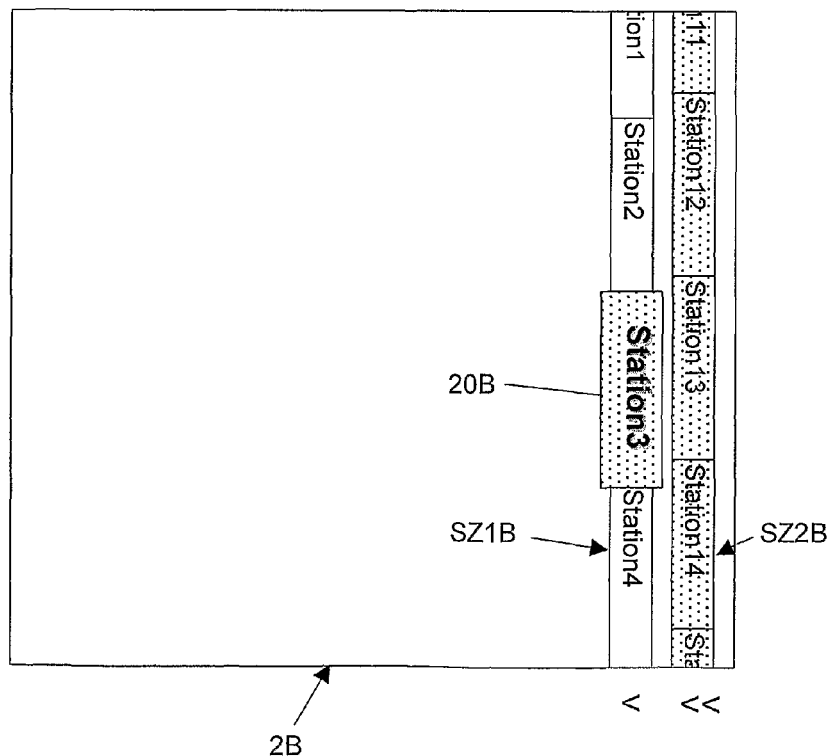
FIG. 5 shows another displaying arrangement for the scrolling texts with station names, in the TV set of FIG. 2.

In another displaying mode, as shown in FIG. 5, the scrolling zones SZ1 and SZ2, respectively noted SZ1B and SZ2B, are shown as vertical bars at the right side of the screen 2, denoted 2B. The scrolling of the station names is then effected vertically. Here, the left scrolling zone SZ1B is activated, indicated by the lighter colour for the background and the lower speed, indicated by the single pointed parentheses. The left scrolling zone bears the apparent selection area 20B.

Several remote control models can be used to control the TV set 6. In a first embodiment, as shown in FIG. 6, a remote control 31 comprises:

infrared emitters 40, upper and lower buttons 41 and 42 for selecting the activated scrolling zone SZ1 or SZ2, left and right buttons 43 and 44 for changing the scrolling direction, e.g. by pressing the button for a short time, or for slowing down/speeding up the scrolling, e.g. by pressing the button for a long time, in dependence of the respective scrolling direction, and a central selection key 45 for selecting the item in the selection area 20 that is associated with the activated scrolling zone.

In an advantageous embodiment of the invention, during a normal operation mode, upper and lower buttons 41 and 42 are used for volume control, and left and right buttons 43 and 44 for station zapping, or conversely. Then, an initial pressure on selection key 45 switches from the normal mode to the selection mode described above. After selection, the remote control 31 automatically switches back to the normal mode.

In another embodiment the remote control 32 shown in FIG. 7 comprises:

the infrared emitters 40, an upper right button 46 having left and right pressure sides, for changing the scrolling direction, e.g. by pressing the button for a short time, or for slowing down/speeding up the scrolling, e.g. by pressing the button for a long time, in dependence of the respective scrolling direction, middle button 47 having upper and bottom pressure sides, for selecting the activated scrolling zone SZ1 or SZ2, and a bottom selection key 48 for selecting the item in the selection area 20 that is associated with the activated scrolling zone.

Here again, in an advantageous embodiment, the remote control 32 can be used also for the normal mode, in the same manner as described for the remote control 31.

The remote control of FIG. 7 may also be used in a different way: The upper right button 46 and the middle button 47 are single contact buttons. Depending on the respective scrolling direction or the respective activated scrolling zone, pressing the button for a short time toggles the activated scrolling zone or reverses the scrolling direction, respectively. Pressing the upper right button for a longer time reduces the scrolling speed of the activated scrolling zone.

In a third embodiment the remote control 33 shown in FIG. 8 relates to a "one-button" design. Further to the infrared emitters 40, the remote control 33 indeed comprises only one key 49. It is then used in the following way:

first pressure: the scrolling is initiated, short time second pressure: the activated scrolling zone is changed, long time second pressure: the current item (in the selection area and in the activated scrolling zone) is selected, short time third pressure: the activated scrolling zone is changed again, long time third pressure: the current item (in the selection area and in the activated scrolling zone) is selected.

After a selection is made, the scrolling may automatically be switched off. If no selection is made, the selection mode, or scrolling may be terminated after a certain time has passed, or if a complete run of all items of a list has been effected in at least one of the scrolling zones.

In a second application embodiment of the selecting system 1, the selecting system 1 is implemented in a music device 7, as shown in FIG. 9, which integrates also the screen 2 and the user interface 3. The music device 7 is also provided with a storing space 8 for recording the items database 21, i.e. music contents, and data 23 on music contents.

Figure 10:
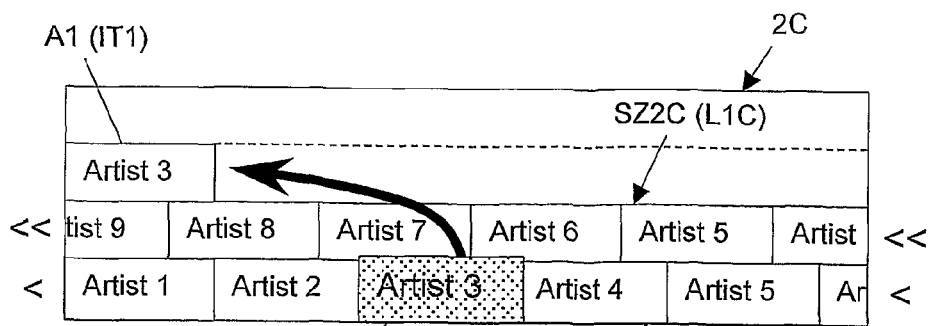
FIG. 10 shows the screen of FIG. 9 with the displaying of two scrolling texts for first step selection of an artist in view of finding a piece of music.

When operated for finding a given piece of music, the selecting system 1 displays on the screen 2, a section of which is shown in FIG. 10. and is referenced 2C, two parallel, adjacent bars defining respectively lower and upper scrolling zones SZ1C and SZ2C. In each of the scrolling zones SZ1C and SZ2C, names of artists are scrolled through the screen 2C from right to left side. The names of the artists as a whole form a first list L1C of items, from which sub-lists are respectively displayed in the scrolling zones SZ1C and SZ2C. Further, the lower scrolling zone SZ1C is here selected as the activated zone for selection, while the upper scrolling zone SZ2C is not. The selection area 20 appears to the user as a reduced selection area 20C, restricted to the lower scrolling zone SZ1C, although the complete selection area 20 may cover in fact both scrolling zones SZ1C and SZ2C. Also, the scrolling of the station names in the upper scrolling zone SZ1C is faster than in the lower scrolling zone SZ2C, indicated by the double pointed parentheses vs. the single pointed parentheses in the lower scrolling zone.

Figure 11:
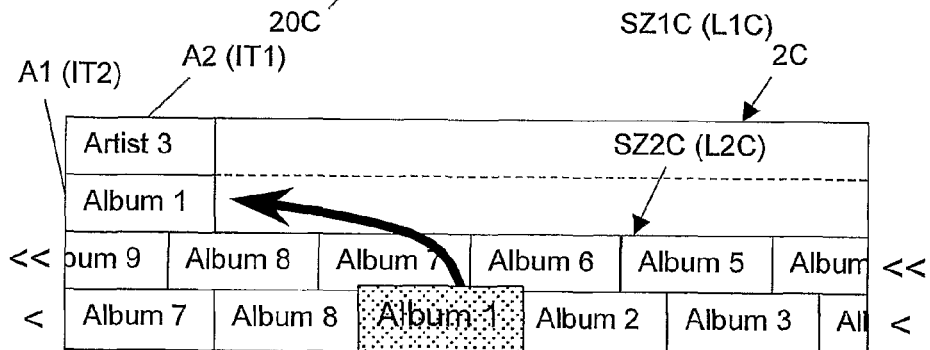
FIG. 11 shows the screen of FIG. 9 with the displaying of two scrolling texts for second step selection of an album in view of finding a piece of music.
Figure 12:
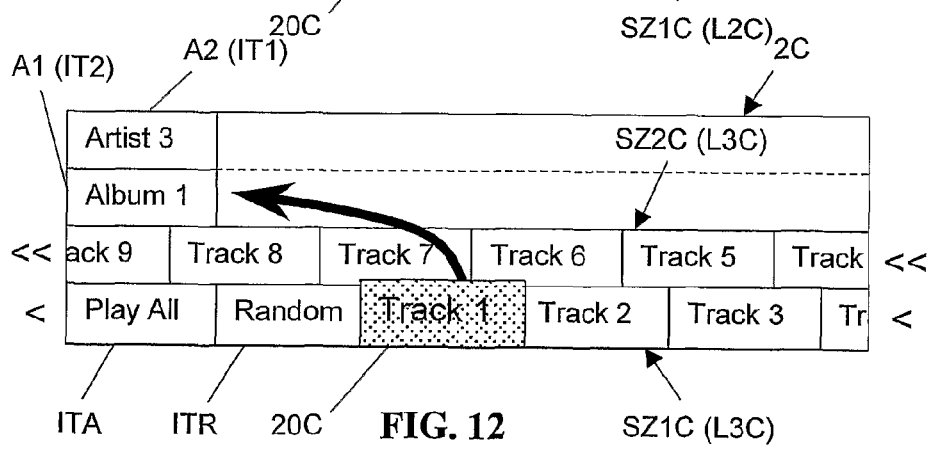
FIG. 12 shows the screen of FIG. 9 with the displaying of two scrolling texts for third step selection of a track in view of finding a piece of music.

In one embodiment of the invention the name of the artist currently appearing in the reduced selection area 20C, noted IT1 for item of the first list L1C, is reported in a left upper area A1. When the user validates the choice of the artist name, the latter moves upwards to a supplementary left upper area A2, as shown in FIG. 11, and remains fixed. The names of the artists in the scrolling zones SZ1C and SZ2C are replaced by names of albums related to the selected artist, whose name is displayed in area A2. The names of those albums, as a whole, form a second list L2C of items that depends on the identity of the artist, i.e. on the item IT1. The second list L2C is thus determined dynamically from the selection in the first list L1C. The name of the album currently appearing in the reduced selection area 20C, noted IT2 for item of the second list L2C, is further reported in the left upper area A1. When the user validates the choice of the album name, the latter remains fixed in the area A1. The names of the albums in the scrolling zones SZ1C and SZ2C are replaced by the names of music pieces associated with tracks that can be found in the selected album, as shown in FIG. 1 2. Those names, as a whole, form a third list L3C of items that depends on the identity of the album, i.e. on the item IT2. The third list L3C is thus determined dynamically from the selection in the second list L2C. The third list L3C also includes two particular items: ITA, for orderly playing all tracks of the selected album, i.e. IT2, and ITR, for playing them randomly.

Figure 13:
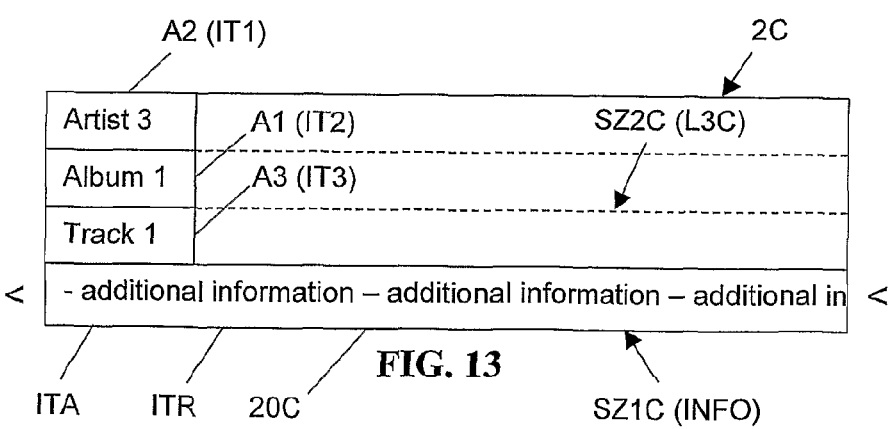
FIG. 13 shows the screen of FIG. 9 with the displaying of additional information corresponding to the selected piece of music in the steps illustrated in FIGS. 10 to 12.

When the item IT3 of the third list L3C is selected, that item IT3, which is either the name of a piece of music or one of the special items ITA and ITR, is displayed in a left area A3 positioned at the level of the upper scrolling zone SZ2C, as shown in FIG. 13. Moreover, additional information INFO on the selected piece of music, the album and/or the artist is scrolled in the lower scrolling zone SZ1C.

In another embodiment the areas A1, A2 do not show the item that is currently in the selection area of one of the scrolling zones. Instead, the areas A1, A2 are not shown until a selection is made. If the selection area A1 is already shown on the screen, it is not shifted to a higher position in order to clear the place for area A2 until a further selection is made.

The additional areas A1, A2 may also be omitted. Although the information content on the screen is reduce in this case, the display may be made smaller. In this case a two-line display may be sufficient.

In an improved version, several list items may be successively chosen for determining the album, for example the composer, the musician, current singer, original singer and so on. Then, more lists are used at first steps, the names of the selected artists being, for instance, displayed side by side in a bar parallel to the scrolling zones SZ1C and SZ2C. Also, a list of date ranges may be used to specify the period of the searched records. The list of albums names is thus determined in function of a set of criteria, for corresponding at the same time to the various chosen artists. A special entry is advantageously provided, for a user to stop the selection of further data, and to search for the appropriate list of albums from the previously selected items. Some special provisions may be implemented to inform the user that no album is available with the given data together, and to invite him to reduce the number of constraints.

The term screen is used throughout this specification as a synonym for any kind of display that is suitable for the invention, including, but not limited to, cathode ray tubes, liquid crystal displays, displays made of organic light emitting diodes and plasma panels.

The invention claimed is:

1. Method for selecting an item in a list of items, the method including the steps of:

dynamically displaying on a screen, adjacent to each other, multiple items from the list of items in a first scrolling zone, wherein the items are scrolled by repeatedly removing items firstly introduced in the first scrolling zone and introducing new items from the list of items into the first scrolling zone;

dynamically displaying on the screen, adjacent to each other, multiple items from the list of items for the first scrolling zone in a second scrolling zone, wherein the items are scrolled by repeatedly removing items firstly introduced in the second scrolling zone and introducing new items from the list of items into the second scrolling zone, and wherein the second scrolling zone is displayed adjacent to the first scrolling zone;

wherein the method further includes the steps of:

presenting a selection area within the first or the second scrolling zone, accepting a user input as a selection command to select one of the items displayed in the first or second scrolling zone being displayed in the selection area, accepting a user input as a command to move the selection zone to the respective other scrolling zone, making the respective scrolling zone within which the selection area is presented an elected scrolling zone.

2. The method of claim 1, wherein the items in the first and second scrolling zones are complementary items from the list of items.

3. The method of claim 1, wherein the displaying step includes displaying each scrolling zone with respective different, contrasting colours for elected arid non-elected scrolling zone.

4. The method of claim 1, wherein the user input for choosing the elected scrolling zone and the selection command are identical, wherein the duration of the user input is used to distinguish between determining the active sub-list and selecting an item.

5. The method of claim 1, further including the step of highlighting the item in the selection area.

6. The method of claim 1, wherein the items in the first and second scrolling zones are displayed a first and a second scrolling speed, the elected scrolling zone preferably being scrolled at a lower speed than the not elected scrolling zone.

7. The method of claim 1, wherein the scrolling direction and/or the scrolling speed of one or more of the scrolling zones are reversed and/or altered, respectively, or that the selection area is displaced in or against the scrolling direction upon a user input.

8. The method of claim 1, wherein the order of the items in the first and/or second scrolling zone is adapted depending on the preceding user selections.

9. The method of claim 1, wherein selected items from the list of items are reproduced several times in the respective scrolling zone during one complete run of all items of the respective sub-list.

10. The method of claim 9, wherein the frequency of occurrence of identical items in the first or second scrolling zone is dependent of preceding user selections.

11. The method of claim 1, wherein at least one of the items out of the list of items that are displayed in the first and/or second scrolling zone is deleted or replaced by one or more items out of a second list, depending on the frequency and/or time of preceding user selections and/or a single user selection of individual items.

12. The method of claim 1, wherein at least one of the items of the first list of items is linked with at least one item in a second list of items, wherein selection of a linked item of the first list of items effects displaying one or all linked item or items of the second list of items in the first and second scrolling zones.

13. The method of claim 1, wherein the item in the selection area and/or the selected item, or the content any of it relates to, is reproduced in an additional area on the screen.

* * * * *